United States Patent Office 3,567,642

Patented Mar. 2, 1971

1

3,567,642

HYDROTHERMAL PROCESS FOR GROWING CRYSTALS HAVING THE STRUCTURE OF BERYL IN AN ALKALINE HALIDE MEDIUM

Edith M. Flanigen, Buffalo, N.Y., assignor to Union Carbide Corporation

No Drawing. Continuation-in-part of application Ser. No. 629,817, Apr. 10, 1967, which is a continuation-in-part of abandoned application Ser. No. 345,605, Feb. 18, 1964. This application Mar. 25, 1968, Ser. No. 715,503
Int. Cl. B01i *17/00;* C04b *35/00*
U.S. Cl. 252—62.58 12 Claims

ABSTRACT OF THE DISCLOSURE

A hydrothermal process for growing relatively large macro-crystals having the structure of beryl. Growth takes place on seed crystals from an alkaline medium which includes alkali metal and/or ammonium halides.

This application is a continuation-in-part of application Ser. No. 629,817, filed Apr. 10, 1967, which is in turn a continuation of application Ser. No. 345,605 filed Feb. 18, 1964 and now abandoned.

This invention relates to a process for growing crystals of beryl and crystallographic analogs of beryl. More particularly, it relates to a process for growing large single crystals of beryl and beryl analogs of a size suitable for scientific and commercial uses from seeds in alkaline aqueous media at elevated temperatures and pressures.

Beryl, which is the only ore of beryllium, is a crystal having the ideal composition of 3.0 $BeO \cdot 1.0$ $Al_2O_3$. 6.0 $SiO_2$, and is commonly found in its natural form in granite. Its crystal structure is a hexagonal system, and it is usually found in the form of long, six-sided prisms. The framework of the crystal structure of beryl is a complex cyclosilicate ring structure in which the silicon atoms are at the centers of a group of four oxygen atoms lying at the points of tetrahedra. The tetrahedral groups are linked together by the sharing of oxygen atoms in the rings having the composition $Si_6O_{18}$. The silica rings are joined together by aluminum atoms lying in the center of a group of six oxygen atoms, and by beryllium atoms in a similar groups of four oxygen atoms. There are two molecules in each unit cell. Beryl ranges in Moh's hardness from 7.5 to 8, and in specific gravity from 2.63 to 2.85.

In addition to pure beryl, there are crystallographic analogs of beryl which are also valuable for scientific and commercial uses. The structure of these analogs is essentially the same as that of beryl, except for the presence of small amounts of materials other than the oxides of beryllium, silicon and aluminum which are present. For example, when small amounts of aluminum are isomorphously replaced by chromium in the beryl crystal structure, a green crystallographic analog of beryl is obtained which has essentially the same crystal structure of beryl. The product thus obtained is commonly known as emerald, although green gemstone emeralds do not necessarily always contain chromium.

When a metal ion other than those of aluminum, silicon and beryllium is incorporated in small amounts in the structure of beryl, the crystal which is thus obtained is commonly known in the art as a "doped" crystal. For example, when small amounts of chromium are incorporated in the crystal structure of beryl, the resulting emerald which is obtained could be considered to be a "chromium-doped" beryl. The ion thus incorporated in the crystal structure is usually referred to as a "dopant ion." For example, in the case of synthetically grown emerald of "chromium-doped" beryl, the chromium which

2 is incorporated in the synthetic crystal would be considered to be the "dopant" ion. Thus, the terms "doped" and "dopant" are well known in the art and are intended to have the above-defined and well known meanings whenever they appear hereafter in this application.

In recent years there has been an increased interest in the art of growing large synthetic crystals. Although ing synthetic crystals for use in the gemstone art (for ing synthetic crystals for us ein the gemstone art (for example, synthetic ruby and synthetic sapphire crystals, etc.) more recent developments in the physics and chemistry of the solid state have created a demand for synthetic crystals which may or may not also be of interest in the field of solid state applications (for example, large synthetic crystals of ruby or red corundum have been used successfully in maser and laser applications).

Although there are several general types of processes known for growing crystals (for example, the Verneuil or flame-fusion process, and the Czochralski method or crystallizing from a melt), these processes have inherent drawbacks or may be inoperable for growing larger synthetic crystals of beryl and beryl analogs. The two mentioned techniques are most often applied to growth of less complex systems and to crystals which melt congruently. The large thermal gradients which are inherent in these processes tend to induce strain, particularly in crystals of large size. A third method of growing single crystals is by the flux-melt method. The disadvantage which is often encountered in the flux-melt method is the incorporation within the crystal growth of the flux material or other undesirable impurities. By the hydrothermal synthesis of single crystals of beryl and beryl analogs to be herein described, strain-free, high-quality, optically transparent materials may be more readily obtained; and the growth of relatively large macro-crystals of synthetic beryl and beryl analogs can be achieved.

Although the hydrothermal process for crystal synthesis is known in the art as a general technique used in crystallization, the applicability of this process depends to a great extent on the particular type of crystal which is being synthesized, the process conditions which are employed, and the compositions of the reactant mixture or medium from which crystallization is being attempted. The hydrothermal process of crystallization is generally understood to mean a process wherein an aqueous solvent under high temperature and pressure is used to increase the solubility of reactants to a point at which crystals of a material may be prepared. Much more difficult and unpredictable, however, is the application of hydrothermal techniques to the growth of single crystals of any size in a controlled manner. An article by R. A. Laudise in Progress in Inorganic Chemistry, vol. III, page 2 (1962) indicates that the utility of this process in preparing a particular type of crystal depends on the discovery of the proper set of conditions for crystal growth. Predictive ability is poor, and a complex series of criteria which may sometimes be mutually exclusive must be compromised before a single crystal can be grown. As further proof of the unpredictability of applying the known principles of the general process in an attempt to prepare a particular crystal, E. J. Gubelin in an article in Gems and Gemology, Winter 1960–1961, pages 105–113, stated that "solvent, nutrient, temperature, pressure and foreign agents are only a few of the variable factors that may render the hydrothermal synthesis a hazardous gamble."

In the prior art there are some references to hydrothermal processes for growing synthetic crystals of beryl and beryl analogs, but none of these references teach a satisfactory method for growing synthetic crystals of pure beryl or doped beryl of any significant size. Although some of the hydrothermal methods for growing synthetic crystals of beryl and beryl analogs which are known in the prior art give a general outline of the systems and conditions which were employed, most references to the prior art processes relating to beryl and beryl analogs tend to be vague and highly speculative in nature.

In an article by G. Van Praagh entitled "Synthetic Quartz Crystals" which appeared in Geological Magazine, vol. 84, pp. 98–100 (1947), the author indicates that Professor R. Nacken of the Mineralogical Institute of Frankfurt University has some success in preparing synthetic crystals of beryl and emerald by a hydrothermal process. The process was apparently somewhat similar to his process for growing quartz, but the details of the process such as the specific mineralizers, nutrients and reaction conditions are not disclosed.

C. F. Chatham of San Francisco successfully grew crystals of beryl as early as 1930, and he has been growing synthetic emeralds for commercial use in the gemstone field since 1935. Although the Chatham process has produced synthetic crystals of significant size and quality, the details of his process have also never been disclosed. Since Chatham first made his crystal products available to the art there has been a considerable amount of speculation by experts in the field as to the process which he employs, but details relating to the actual process are still unavailable at the present time. E. A. D. White in an article in Quarterly Reviews, vol. 15 (1961), pp. 1–29, hypothesized that Chatham's process was a hydrothermal process wherein crushed beryl was the nutrient, but details of the process were not given. Others have more recently suggested that the Chatham process is a flux-fusion process, and not the hydrothermal process that it was originally believed to be.

In addition to the Chatham synthetics discussed above, another emerald substitute which has recently appeared on the market is Lechleitner's "Emerita" stones. The details of the process used in preparing these stones have not been revealed, but these stones are apparently a product of a process wherein a thin synthetic emerald overgrowth or layer is applied to a relatively large faceted beryl seed. Gubelin has presented an hypothesis as to Lechleitner's process, indicating that this process may be analogous to Nacken's process for growing quartz, and that the synthesis of the emerald overgrowth is brought about in an alkaline medium under pressures of approximately 1000 atmospheres and at temperatures between 300 and 400° C. In contrast to Gubelin's hypothesis of Lechleitner's process, the work of Wyart and Scavnicar (Bull. Soc. franc. Miner Crist. LXXX, pp. 305–306 [1957]) indicated that the incorporation of trace amounts of $NaHCO_3$ to give a weakly alkaline medium did not improve their hydrothermal process for synthesizing micro-crystals of beryl, and that the presence of more than trace amounts of this alkali caused the formation of undesirable impurities such as albite and feldspar.

The principal object of the present invention is to provide a process for synthesizing single crystals of beryl and beryl analogs doped with transition metal or rare earth metal ions.

Another object is to provide synthetic crystals of beryl and beryl analogs doped with transition metal or rare earth metal ions which are of a size suitable for use in the gemstone art and in solid-state devices.

Other and further objects and advantages of the present invention and the preferred embodiments thereof will become apparent and are disclosed in detail in the following description.

The present invention relates to a hydrothermal process for growing single crystals having the structure of beryl which comprises depositing a composition having the structure of beryl on a seed crystal from an aqueous reactant mixture which comprises (1) at least a major amount of (A) sources of oxides of beryllium, aluminum and silicon and (B) an alkaline halide medium which comprises at least one member selected from the class consisting of alkali metal halides and ammonium halides and (2) up to a minor amount of (C) sources of ions of at least one metal selected from the class consisting of the transition metals iron and nickel and rare earth metals as a dopant, said process being operated at a temperature of at least 425° C. and under a pressure of at least 7000 pounds per square inch.

The rare earth metals useful in the process of this invention are those having atomic numbers from 57 through 71, inclusive. A preferred rare earth metal is neodymium.

Transition metals other than iron and nickel are operable in the process of this invention, but some of these metals cause slow growth on the seed crystal and/or are incorporated as dopants in the grown crystal to a very small extent. For example, when $Cr_2O_3$ is included in the reactant mixture in the process of this invention as a source of chromium ions in an amount sufficient to provide 4 weight percent chromium in the crystal, such small amounts of dopant chromium ions are actually incorporated into the crystal that the green color characteristics of chromium-doped beryl is very pale and the crystal is not suitable for use as a gemstone.

Since the process of this invention is a hydrothermal process which is conducted at elevated temperatures and pressures, the process is most easily conducted in a sealed reaction vessel, autoclave or bomb of a type well known in the hydrothermal art of crystal synthesis. A variety of these reaction vessels are commercially available and are highly suitable for use in practice of this invention. The reaction vessel which is employed should be constructed of a high strength, corrosion-resistant steel in order to withstand the pressures and temperatures encountered in the present process. One such suitable material is a nickel alloy of a high strength, stainless-steel. The reaction vessel may also be provided with a liner or capsule of a noble metal, such as silver, platinum or gold. Several designs for high pressure reaction vessels are suitable for use in conducting the process of this invention, for example, those described by A. A. Ballman and R. A. Laudise ["Hydrothermal Growth," The Art and Science of Growing Crystals, (1963) pp. 232–235].

The silicon, beryllium and aluminum oxide nutrients which are present in the aqueous alkaline reactant mixture are usually present in the form of hydrous oxides of these metals. Any convenient source of the oxides of silicon may be employed as a starting material, such as, for example, optical grade quartz crystal, fused quartz, $SiO_2$ porous glass and the like. The use of optical grade quartz crystal is preferred. Similarly as a source for the oxides of aluminum one may employ materials such as sapphire, gibbsite ($Al_2O_3 \cdot 3H_2O$), aluminum hydroxide which has been precipitated from solutions of aluminum salts such as aluminum nitrate and the like. Convenient sources of the oxides of beryllium are materials such as beryllium hydroxide [$Be(OH)_2$], beryllium oxide, and the like. Although the composition of the reactant mixture with respect to the oxides of silicon, beryllium and aluminum may vary over a wide range, a reactant mixture containing these oxides in amounts which closely approximate the stoichiometric amount of these oxides in the composition of ideal beryl crystal ($3.0\ BeO \cdot 1.0\ Al_2O_3 \cdot 6.0\ SiO_2$) is preferred.

When doped beryl crystals are prepared according to the present process, the source of the transition metal or rare earth metal ion dopant which is present in the reactant mixture is a metal compound such as a transition metal or rare earth metal hydroxide, a transition metal or rare earth metal nitrate, a transition metal or rare earth metal oxide, a transition metal or rare earth metal halide, a transition metal or rare earth metal sulfate, and the like. The source of the metal ion dopant may also be the reaction vessel itself. For example, in the case where an unlined, nickel-alloy stainless steel reaction vessel is employed, the bomb materials may supply the iron and/or nickel ions.

Although it theoretically should be possible to incorporate over 10% by weight of a transition metal or rare earth metal ion dopant into the beryl structure, lower weight percentages of dopant are normally incorporated into the beryl crystal by the process of this invention. Depending primarily on the requirements dictated by the particular end use of the crystal being grown, the concentration of transition metal or rare earth metal ion dopant in the crystal product may vary from about .005 weight percent to about 8 weight percent, based on the total weight of the crystal. An amount between 0.01 weight percent and 2 weight percent is preferred. In order to provide an amount of transition metal or rare earth metal ion dopant sufficient to produce crystals containing dopants in amounts within the ranges of percentages set forth above, the reactant mixture should contain a transition metal or rare earth metal ion concentration of from about 0.01 weight percent to about 11 weight percent, based on the weight of beryl equivalent to the aluminum, silicon and beryllium oxide nutrients in the initial charge. Preferable, the concentration of transition metal or rare earth ion is from 0.05 weight percent to 2 weight percent, based on the theoretical weight of beryl from the oxide sources. More than one transition metal or rare earth metal ion may be used simultaneously as a dopant in the initial charge.

Another essential component of the aqueous reactant mixture of the process of this invention is an alkaline halide medium which comprises at least one member selected from the class consisting of alkali metal halides and ammonium halides. In the absence of this alkaline halide medium little or no growth of beryl or doped beryl occurs, and excessive formation of impurities such as chysoberyl and phenacite has been observed. The preferred alkaline halide media are alkali metal halides such as potassium fluoride; and mixtures of ammonium halides with ammonium hydroxide, such as ammonium fluoride and ammonium hydroxide. A mixture of ammonium fluoride and ammonium hydroxide is particularly preferred. The alkaline halide medium which is employed should be present in an amount sufficient to provide a reactant mixture having a pH at 25° C. of from more than 7 to a pH of 12.5. A pH of from 9 to 10 is preferred.

Although the concentration of the alkaline halide medium which is employed may be varied over a wide range, the limits of the concentration appear to be dependent on a number of factors, such as the pressure and temperature at which the reaction is conducted, the overall composition of the reactant mixture, and the alkaline halide medium which is employed. When a mixture of an ammonium halide with ammonium hydroxide is employed, concentrations of less than .01 N do not provide a system which is satisfactory for growing large single crystals of beryl and beryl analogs at an appreciable rate, and concentrations in excess of 0.3 N demonstrate no advantages over concentrations of from 0.01 N to 0.3 N. When an alkali metal halide is employed, concentrations of from 0.01 N to 0.2 N should be used. Concentrations appreciably greater than 0.2 N appear to promote the additional formation of feldspar as a undesirable impurity. One system which has provided highly satisfactory results is a reactant mixture containing about 0.1 N ammonium fluoride and about 0.1 N ammonium hydroxide as the alkaline halide medium. This is the alkaline halide medium which is particularly preferred.

In practicing the process of the present invention the synthetic beryl or doped beryl is grown on a seed crystal located within the sealed reaction vessel. The nutrient oxides and dopant, if any, migrate to the region of the seed, and beryl or doped beryl crystallizes thereon. Although any crystal having the structure of beryl or other suitable substrate may be used as a seed, a seed crystal of natural or synthetic beryl or a beryl analog is usually employed. Normally, the reaction is continued until the new growth of synthetic beryl or metal ion-doped beryl is thick enough to be cut from the original seed. This new growth may then be employed as a seed crystal in further subsequent reactions. In this way macro-crystals of only synthetic hydrothermal origin are obtained. This is particularly useful in preparing macro-crystals of doped beryl having high purity and uniform composition or structure. Large synthetic crystals may also be obtained by conducting a series of short-term runs wherein fresh oxide nutrient and solution are used in each run of the series. A highly favorable aspect of this invention is the ability to achieve and maintain favorable growth rates over extended periods of time. For example, an average growth rate of 0.1 mm. per day in the length of an edge of a crystal has been maintained over a period of 15 days, and an average of as high as 0.05 mm. per day has been maintained over a period of a month.

Another favorable aspect of this invention is the ability to substantially confine growth of crystal having the structure of beryl to the seed, and to obtain single crystal growth on said seed or seeds which is substantially flawless and optically transparent. Spontaneous nucleation and twinning on the surface of the seed is eliminated.

Although the condition of the surface of the seed crystal which is employed may influence the rate of growth of new material on the seed, it has been found that the rate of growth on the sawed faces of a seed crystal is about the same, and in some instances better than the rate of growth observed on a fractured face of a seed crystal. However, the growth rate is somewhat dependent on the axial orientation of the seed face upon which the new growth is being deposited and the oxide sources which are being employed. When powdered beryllium hydroxide and powdered aluminum hydroxide are employed, growth is fastest on faces cut approximately 45° to the crystallographic *c*-axis, and the rate of growth decreases as the face approaches a position parallel to the *c*-axis or a position perpendicular to the *c*-axis. Favorable growth rates are also obtained on faces cut within the range of 30° to 60° of the *c*-axis. When sintered beryllium oxide and sapphire are employed, growth is fastest on seeds cut parallel to the *c*-axis and perpendicular to the prism face, and poorer growth rates are observed as the cuts approach the plane of the prism base. Using the process of this invention, growth rates of greater than 0.2 mm. per day in the length of an edge of the crystal have been achieved.

The present process for growing crystals of beryl and doped beryl is conducted at temperatures of from about 425° C. to about 800° C. and at calculated pressures of from about 7000 pounds per square inch to about 30,000 pounds per square inch, pressure. Although it may be difficult to determine with absolute accuracy the actual operating pressure for the high-pressure systems employed in the present process, the internal pressure within the reaction vessel can be calculated from known pressure-temperature-volume data on water. Knowing the volume of the reaction vessel, the volume of the reactant mixture and the reaction temperature, the reaction pressure can be most conveniently calculated by using the pressure-temperature-volume data for pure water published by G. C. Kennedy in American Journal of Science, vol. 248, p. 540 (1950). Although the presence of solutes lowers the pressure of the system somewhat from that of pure water, this effect is not appreciable in the process of this invention. It should be understood that the upper limits of temperature range and particularly the pressure range are dependent to a great degree on the equipment which is available, and that these upper limits be extended if equipment could be designed to withstand the higher temperatures and pressures. With the equipment which is presently available, the reaction temperature is from about 425° C. to about 800° C., and the pressure is from about 7000 pounds per square inch to about 30,000 pounds per square inch. A temperature of from 475° C. to 600°

C. and a pressure from 15,000 pounds per square inch to 25,000 pounds per square inch is preferred.

It has also been found that the growth rate may be accelerated somewhat by maintaining a temperature differential between the upper and lower portions of the reaction vessel or bomb. This differential may be achieved by providing a separate heating element for the lower portion of the reaction vessel or bomb, and then positioning the reaction vessel and the heating element in a large tube furnace which is maintained at a temperature which is lower than that produced by the heating element. In this manner, a temperature differential is easily maintained by suitable control of the bomb and the furnace heaters. A temperature differential between the top and the bottom of the reaction vessel of from about 15° C. to about 100° C. may be employed. A differential of about 20° C. is preferred.

It has also been found that the rate of growth may be affected by the geometry of the seed crystal and the oxide nutrient sources within the reaction vessel. For best results the seed crystal should be positioned at a point in the reaction vessel which is intermediate to the zone wherein the silica source is located and zone wherein the beryllium oxide and aluminum oxide sources are located. Throughout the reaction the seed crystal and all of the oxide sources are in intimate contact with the aqueous alkaline halide reactant mixture. The relative distances between the silicon oxide source, the seed crystal or crystals, and the beryllium and aluminum oxide sources have not been found to be critical. An arrangement which has been found to be highly suitable for growing single crystals of good quality at relatively high growth rates is one in which the oxide sources of beryllium oxide and aluminum oxide are placed at the bottom of the reaction vessel, the silicon oxide source is suspended by means of a wire or a porous gauze basket of noble metal in the upper portion of the reaction vessel, and the seed crystal or seed crystals are suspended by means of a noble metal wire at a point in-between.

It is also possible to employ multiple groups of oxide sources and seed crystals within a reaction vessel wherein individual sets of oxide sources and seeds are "stacked" in separate arrangements similar to that set forth above, and all are in contact with a common aqueous alkaline halide medium. The number of sets which may be employed is determined primarily by the available volume of the reaction vessel. The "stacked" system is a particularly preferred method for carrying out the process of this invention.

When crystals prepared according to the process of this invention are removed from the reaction vessel after it has cooled, the surfaces of these crystals may be covered with other phases or impurities which formed within the autoclave during cooling. Although these phases or impurities are not substantial in quantity, any impurities may be removed before use of the crystal product as a gemstone or in a solid-state device by washing with hot or cold dilute acid solutions and water or by scrapping the surfaces clean.

A distinguishing characteristic of the crystals produced by the process of this invention is their infrared spectrum. All of the crystals produced by the present process are characterized by a strong absorption band in the OH-stretch region near 3700 reciprocal centimeters and the absence of a strong band in either of the absorption regions (a) near 3600 reciprocal centimeters and (b) between about 1600 and about 1650 reciprocal centimeters. The infrared spectra of the crystals of this invention are measured by conventional techniques employed on powdered solids, for example, KBr wafer or mull methods. This characteristic infrared spectrum makes it possible to distinguish crystals produced by the process of this invention from natural beryl and beryl analogs. For example, natural emeralds also show a strong absorption band at 3700 cm.$^{-1}$ but, in addition, have a strong band between 1600 and 1650 cm.$^{-1}$ and often a band near 3600 cm.$^{-1}$.

The crystals of this invention can also be distinguished from any type of flux-grown beryl or beryl analog because the crystals of this invention has high quality and a lack of flux inclusions, and because flux-grown beryl and beryl analogs have infrared spectra devoid of any significant absorption bands characteristic of hydroxyl groups.

Following are examples of the practice of the invention which is hereinbefore described:

EXAMPLE I 0.45 gram of gibbsite ($Al_2O_3 \cdot 3H_2O$) and 0.37 gram of powdered beryllium hydroxide were placed at the bottom of a pressure vessel fabricated from high-strength, nickel-alloy, stainless steel which had an internal volume of 50 cc. and a reaction chamber 17 cm. long. A piece of crystal quartz weighing 0.5275 gram was suspended by means of a platinum wire 3 cm. from the top of reaction vessel, and a natural beryl seed crystal weighing 0.4195 gram was suspended in the same manner at a point midway between the silica and the alumina-beryllia sources (i.e., at about 10 cm. from the top of the reaction chamber). The vessel was then filled to 62% of its capacity with an aqueous solution of 0.1 N $NH_4F$ and 0.1 N $NH_4OH$ having a pH of 9.2 at 25° C. and sealed. The vessel then was placed in a furnace and heated to 500° C., at which the internal pressure was 20,000 pounds per square inch, and the vessel was maintained at a temperature of from 490° C. to 510° C. for a period of seven days. After the seven day reaction period, the vessel was removed from the furnace, quenched with water until cooled, and opened. The seed crystal with the new growth of beryl was removed from the reaction vessel, cleaned with hot dilute solution of hydrochloric and hydrofluoric acids and water and dried. Upon weighing, the seed crystal was found to have gained 0.0833 gram of new transparent beryl growth, thus a gain of about 20% by weight was obtained. The calculated average linear growth rate was 0.05 mm./day in the length of an edge of the crystal.

EXAMPLE II 0.53 gram of gibbsite and 0.46 gram of powdered beryllium hydroxide were placed at the bottom of a reaction vessel similar to that described in Example I. 0.876 gram of crystal quartz were placed in a platinum gauze basket which was suspended at about 3 cm. from the top of the reaction chamber, and two beryl seed crystals were suspended below the platinum basket by means of a platinum wire. One of the beryl seed crystals was a piece of prismatic beryl weighing 0.4899 gram which was cut at an angle of 45° to the *c*-axis of the prism, and the other seed crystal a freshly-cleaved, randomly oriented piece of prismatic beryl weighing 0.7283 gram. The vessel was then filled to 62% of capacity with an aqueous solution of 0.1 N $NH_4F$ and 0.1 N $NH_4OH$ and sealed. The vessel was placed in a furnace and heated to 500° C., at which the internal pressure was 20,000 pounds per square inch, and the vessel was maintained at a temperature of from 490° C. to 510° C. for a period of seven days. The vessel was then removed from the furnace, quenched with water until cooled, and opened. The seed crystals were removed from the reaction vessel, cleaned with dilute hydrofluoric acid and water and dried. Upon weighing the beryl seed which was cut at a 45° angle to the *c*-axis was found to have gained 0.0901 gram, a gain of 18.4% by weight of new growth at an average linear growth rate of 0.05 mm./day. The cleaved beryl seed gained 0.1010 gram, a gain of 13.9% at an average linear growth rate of 0.04 mm./day. The new growth in each instance was transparent and flawless.

EXAMPLE III 0.86 gram of gibbsite and 0.71 gram of powdered beryllium hydroxide were mixed, pressed into a pellet, and placed at the bottom of a reaction vessel similar to that described in Example I. 1.8025 grams of crystal quartz were suspended at about 3 cm. from the top of the reaction chamber, and a natural beryl seed crystal weighing 0.3248 gram was suspended at a point midway between the quartz and the alumina-beryllia sources. The vessel was then filled to 62% of its capacity with an aqueous solution of 0.01 N KF and sealed. The vessel was placed in a furnace to heat to 500° C. (the internal pressure was estimated to be approximately 20,000 pounds per square inch), and the vessel was maintained at a temperature of 500° C. for a period of seven days. After this period of time the vessel was cooled and opened, and the beryl seed after washing and drying was found to have gained 0.0094 gram (a gain of 2.9%). The average linear growth rate was 0.01 mm./day.

EXAMPLE IV 0.55 gram of sintered beryllium oxide, 0.78 gram of sapphire and 0.74 gram of crystal quartz were placed in a platinum bucket at the bottom of a platinum-lined pressure vessel having a reaction chamber approximately three-quarters of an inch in diameter and six and one-half inches long. Four seed crystals weighing from 0.07 gram to 0.38 gram were then suspended above the platinum bucket. A second platinum bucket containing 0.57 gram of sintered beryllium oxide, 0.73 gram of sapphire and 0.83 gram of crystal quartz was suspended above the seed crystals and at approximately the midpoint of the reaction chamber, and an additional four seed crystals weighing from 0.07 gram to 0.61 gram were suspended above this second platinum basket. A third platinum bucket containing 0.56 gram of sintered beryllium oxide, 0.75 gram of sapphire, and 0.69 gram of crystal quartz was suspended in the upper-portion of the reaction chamber above this second set of seed crystals. 33.7 cc. of an aqueous solution of 0.1 N $NH_4F$ and 0.1 N $NH_4OH$ was added to fill the reaction chamber to 62% of its capacity. The reaction vessel was sealed, placed in a furnace and heated to 500° C., at which the internal pressure was 20,000 pounds per square inch, and the vessel was maintained at this temperature for 31 days. The vessel was then removed from the furnace, cooled and opened. The eight seeds which originally weighed a total of 2.06 grams weighed 2.97 grams after the 31 day period of growth. The 0.91 gram of new growth represented a gain of 44.3% in weight. Three of the eight seeds grew at an average linear growth rate of 0.046 mm./day.

EXAMPLE V 2.4 grams of powdered beryllium oxide and 2.9 grams of gibbsite were placed at the bottom of a reaction vessel similar to that described in Example IV. 6.7 grams of crystal quartz was placed in a platinum bucket in the upper portion of the reaction chamber, and three seed crystals weighing 0.0468, 0.0478 and 0.0334 gram respectively were suspended at a point approximately midway between the silica and the alumina-beryllia sources. The reaction chamber was filled to 63% of its capacity with 34.3 cc. of an aqueous solution of 0.1 N $NH_4F$ and 0.1 N $NH_4OH$ and the reaction vessel was sealed. An auxiliary furnace was attached to the bottom of the reaction vessel in order to maintain a temperature differential between the top and the bottom of said vessel, and the vessel with the auxiliary furnace attached was placed in a larger furnace and heated to 500° C. The top of the reaction vessel was maintained at a temperature of 500° C. while the bottom of the reaction vessel was maintained at a temperature of 550° C. through use of the auxiliary heater. The resultant pressure within the reaction vessel was approximately 20,000 pounds per square inch. After three and one-half days the reaction vessel was removed from the larger furnace and allowed to cool. After the seeds were removed and cleaned, they weighed 0.0629, 0.0550 and 0.0434 gram respectively, representing increases in weight of 34%, 15% and 30% respectively. This represents a growth of clear transparent beryl at average linear growth rates of 0.077 mm./day, 0.036 mm./day and 0.060 mm./day.

EXAMPLE VI 0.46 gram of beryllium hydroxide, 0.53 gram of gibbsite, 1.34 grams of quartz were placed in a reaction vessel similar to that described in Example IV and were arranged in said vessel in a manner similar to that described in Example V. A seed crystal weighing 0.1353 gram sawed from a piece of natural beryl having faces cut at 48° to the *c*-axis was suspended at a point midway between the silica and the alumina-beryllia sources. 32.5 cc. of an aqueous solution of 0.1 N $NH_4F$ and 0.1 N $NH_4OH$ were added and the vessel was sealed. The vessel was placed in a furnace and heated to 510° C. (approximately 20,000 pounds per square inch pressure) for seven days. The seed crystal gained 0.0123 gram. The average linear growth rate was 0.02 mm./day. The nutrients and alkaline halide medium were replenished, and this same seed crystal was used under similar reaction conditions for an addition 30 day period. This second period of growth resulted in 0.144 gram of new crystal, and an average linear growth rate of 0.03 mm./day, and the overall weight increase over the two growth periods was equivalent to an increase of 115%.

EXAMPLE VII

In an arrangement similar to that employed in Example IV, approximately 0.3 gram of sintered beryllium oxide rod, 0.4 gram of sapphire and 1.3 grams of crystal quartz were placed in each of three platinum buckets in a 6 inch-deep gold crucible. Two seed crystals were suspended above the bottom bucket, two seed crystals were suspended above the middle bucket, and 0.003 gram of powdered neodymium oxide (an amount sufficient to provide about 0.05 weight percent neodymium ion, based on the theoretical weight of beryl equivalent to the amounts of oxides present) was placed at the bottom of the crucible. 12.51 cc. of an aqueous solution of 0.1 N $NH_4F$ and 0.1 N $NH_4OH$ were added to the gold crucible, and the crucible and its contents were placed in a high-strength, nickel-alloy stainless-steel reaction vessel. An additional 12.73 cc. of 0.1 N $NH_4F$ and 0.1 N $NH_4OH$ solution were added to the reaction vessel to fill it up to 62% of its capacity, and the vessel was sealed. The vessel was then placed in a furnace heated to 550° C. (25,700 pounds per square inch pressure) and maintained at this temperature for 14 days. At the end of the growth period the seed crystals exhibited weight increases of from 4% to 82%. The overall average linear growth rate was 0.048 mm./day, and the new growth of crystal was clear and transparent, except for a few wispy inclusions. Two of the crystals exhibited growth rates of 0.08 mm./day. Analysis of a portion of the new growth revealed a neodymium content of 0.013%.

EXAMPLE VIII 0.48 gram of powdered beryllium hydroxide and 0.56 gram of gibbsite were placed at the bottom of an unlined reaction vessel similar to that described in Example I and 1.34 grams of quartz were suspended in a platinum basket in the upper-portion of the reaction chamber. A small seed weighing 0.0540 gram was suspended between the silica and the beryllia-alumina sources and the vessel was filled to 65% of its capacity with an aqueous solution of 0.1 N $NH_4F$ and 0.1 N $NH_4OH$. The reaction vessel was then sealed, placed in a furnace, and heated to 500° C. (approximately 22,500 pounds per square inch) for a period of 14 days. After allowing the vessel to cool, it was opened and the seed crystal was found to have gained 0.0564 gram (an increase of 104%). The average linear growth rate was 0.05 mm./day. Analysis of new growth by emission spectroscopy revealed an iron content of between $10^{-1}$ and $10^{-2}$% by weight and a nickel content of $10^{-1}$% by weight, the source of both the iron and nickel being material from the unlined bomb.

An analysis of a typical sample of undoped beryl prepared according to the process of this invention is as follows:

| | Weight percent | Moles per mole of $Al_2O_3$ |
|---|---|---|
| $SiO_2$ | 63.2±0.8 | 5.57 |
| $Al_2O_3$ | 19.3±0.5 | 1.00 |
| BeO | 13.1±0.8 | 2.77 |
| $H_2O$ | 2.3±0.8 | 0.7 |

Single crystals of beryl and beryl analogs synthesized by the process of this invention may also contain small quantities of halide ions. For example, in one of the preferred embodiments of this invention wherein the alkaline halide medium which was employed was 0.1 N ammonium fluoride and 0.1 N ammonium hydroxide, the resulting crystals were found to contain fluoride ion. In addition, the crystals prepared by the process of this invention were found to differ from the ideal stoichiometry for beryl ($3.0BeO \cdot 1.0Al_2O_3 \cdot 6.0SiO_2$) as can be seen from the typical analysis set forth above. The crystals prepared by the process of this invention were found to have a specific gravity of from 2.66 to 2.74 and a mean refractive index of 1.56 to 1.57.

Though specific embodiments have been shown and described, it is to be understood that they are illustrative only, and are not to be construed as limiting the scope and spirit of this invention.

What is claimed is:

1. A hydrothermal process for growing single crystals having the structure of beryl which comprises: depositing a composition having the structure of beryl on a seed crystal from an alkaline aqueous reactant mixture having an initial pH at 25° C. of from more than 7 to 12.5 and consisting essentially of: (1) at least a major amount of (a) sources of oxides of beryllium, aluminum and silicon, and (b) a halide solvent medium which consists essentially of water and at least one or more alkali metal halides and/or ammonium halides, and (2) up to minor amounts of sources of one or more of the dopant metals iron, nickel and neodymium; said process being carried out at a temperature of at least 425° C. and under a pressure of at least 7000 pounds per square inch.

2. The process in accordance with claim 1 wherein said dopant metal is neodymium.

3. The process in accordance with claim 1 wherein said sources of oxides of beryllium, aluminum and silicon are present in amounts which provide substantially the stoichiometric amounts of beryllium, aluminum and silicon oxides in the composition of an ideal beryl crystal ($3.0\ BeO \cdot 1.0\ Al_2O_3 \cdot 6.0\ SiO_2$).

4. The process in accordance with claim 1 wherein said aqueous reactant mixture has an initial pH at 25° C. of from 9 to 10.

5. The process in accordance with claim 1 wherein said alkaline halide medium comprises a mixture of ammonium fluoride and ammonium hydroxide.

6. The process in accordance with claim 5 wherein said alkaline halide medium consists essentially of 0.1 normal ammonium fluoride and 0.1 normal ammonium hydroxide.

7. The process in accordance with claim 5 wherein said process is carried out in a closed reaction vessel, said seed crystal has the structure of beryl, and the temperature at the bottom of said reaction vessel is at least 15° C. higher than the temperature at the top of said vessel.

8. The process in accordance with claim 7 wherein two or more sets of oxide sources, each set comprising sources of beryllium oxide, silicon oxide, and aluminum oxide, are disposed one above the other within said vessel with one or more seed crystals disposed between each two of said sets.

9. The process in accordance with claim 8 wherein said source of beryllium oxide is sintered beryllium oxide, the source of aluminum oxide is sapphire, the source of silicon oxide is crystal quartz, and wherein the temperature at the bottom of the vessel is between 475° C. and 600° C. and the pressure is between 15,000 and 25,00 pounds per square inch.

10. The process in accordance with claim 9 wherein said seed crystal has a face cut thereon parallel to the *c*-axis and perpendicular to the prism face.

11. The process in accordance with claim 1 wherein said seed crystal has the structure of beryl and has a face cut thereon within an angle of from 30° to 60° with the *c*-axis of the crystal.

12. The process in accordance with claim 1 wherein said alkaline halide medium comprises potassium fluoride.

References Cited

UNITED STATES PATENTS

| | | | |
|---|---|---|---|
| 2,680,677 | 6/1954 | Broge et al. | 23—301 |
| 3,234,135 | 2/1966 | Ballman et al. | 252—62.58 |

OTHER REFERENCES

Herbert Smith Memorial Lecture: "Journal of Gemology," v. 8, 1961, pp. 88–95.

Kroger: "Some Aspects of the Luminescence of Solids" Elsevier Pub. Co., 1948, pp. 266, 267, 268, 269, 274, 275, 292, 293.

Van Praagh: "Chemical Abstracts," vol. 41 (1947), p. 6839 i and 6840 gh.

TOBIAS E. LEVOW, Primary Examiner

J. COOPER, Assistant Examiner

U.S. Cl. X.R.

23—110, 301, 305; 106—42; 252—62.59, 62.62, 301.4F